United States Patent
Oh et al.

(10) Patent No.: US 12,154,721 B2
(45) Date of Patent: Nov. 26, 2024

(54) MULTILAYER ELECTRONIC COMPONENT, AND METHOD OF MANUFACTURING THE SAME

(71) Applicant: SAMSUNG ELECTRO-MECHANICS CO., LTD., Suwon-si (KR)

(72) Inventors: Young Joon Oh, Suwon-si (KR); Jeong Ryeol Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 135 days.

(21) Appl. No.: 17/883,154

(22) Filed: Aug. 8, 2022

(65) Prior Publication Data

US 2023/0082454 A1 Mar. 16, 2023

(30) Foreign Application Priority Data

Sep. 14, 2021 (KR) .......................... 10-2021-0122733
Apr. 20, 2022 (KR) .......................... 10-2022-0048917

(51) Int. Cl.
*H01G 4/008* (2006.01)
*H01G 4/012* (2006.01)
*H01G 4/30* (2006.01)

(52) U.S. Cl.
CPC ........... *H01G 4/0085* (2013.01); *H01G 4/012* (2013.01); *H01G 4/30* (2013.01)

(58) Field of Classification Search
CPC ......... H01G 4/0085; H01G 4/012; H01G 4/30
See application file for complete search history.

(56) References Cited

U.S. PATENT DOCUMENTS

| 5,773,168 A * | 6/1998 | Kubo | H01M 4/525 |
| | | | 29/623.5 |
| 6,156,456 A * | 12/2000 | Izumi | H01M 4/52 |
| | | | 429/223 |
| 2013/0321976 A1* | 12/2013 | Lee | H01G 4/008 |
| | | | 977/773 |

FOREIGN PATENT DOCUMENTS

| EP | 0360863 A1 * | 4/1990 |
| JP | 2004-330247 A | 11/2004 |
| JP | 2004311144 A * | 11/2004 |
| KR | 10-2018-0101504 A | 9/2018 |

\* cited by examiner

*Primary Examiner* — Michael P McFadden
(74) *Attorney, Agent, or Firm* — Morgan, Lewis & Bockius LLP

(57) ABSTRACT

A multilayer electronic component includes a body including a plurality of dielectric layers, a plurality of internal electrodes, a capacitance formation portion in which the plurality of dielectric layers and the plurality of internal electrodes are alternately disposed in a first direction, a first cover portion disposed on one surface of the capacitance formation portion in the first direction and including a dielectric layer, and a second cover portion disposed on the other surface of the capacitance formation portion in the first direction and including a dielectric layer; and an external electrode disposed on the body, wherein, if an internal electrode disposed closest to the first cover portion, among the plurality of internal electrodes, is referred to as IE1, a ratio of $Ni(OH)_2$ mass to NiO mass in IE1 is 4.5 or more and 7.5 or less.

35 Claims, 9 Drawing Sheets

MULTILAYER ELECTRONIC COMPONENT, AND METHOD OF MANUFACTURING THE SAME

CROSS-REFERENCE TO RELATED APPLICATION(S)

This application claims benefit of priority to Korean Patent Application No. 10-2021-0122733 filed on Sep. 14, 2021 and Korean Patent Application No. 10-2022-0048917 filed on Apr. 20, 2022 in the Korean Intellectual Property Office, the disclosures of which are incorporated herein by reference in their entirety.

TECHNICAL FIELD

The present disclosure relates to a multilayer electronic component and a method for manufacturing the same.

BACKGROUND

A multilayer ceramic capacitor (MLCC), a type of multilayer electronic component, may be a chip type capacitor mounted on the printed circuit boards of various types of electronic products such as image display devices including liquid crystal displays (LCDs), plasma display panels (PDPs), and the like, and computers, smartphones, mobile phones, and the like, serving to charge or discharge electricity therein or therefrom.

Such a multilayer ceramic capacitor may be used as a component of various electronic devices due to having a relatively small size, relatively high capacity, and relative ease of mounting. As sizes of the components of electronic devices decrease, demand for decreasing the size and increasing the capacity of multilayer ceramic capacitors is increasing.

In order to achieve the demand for decreasing the size and increasing the capacity of multilayer ceramic capacitors, it is necessary to reduce a thickness of a dielectric layer and a thickness of an internal electrode to increase the number of stacked layers. At present, the internal electrode has reached a thickness of about 0.6 µm, and is continuing to be thinner. However, in order to reduce the thickness of the internal electrode, a metal powder as a base material has been atomized. Thereby, a sintering shrinkage initiation temperature has been lowered, and mismatch in shrinkage behavior with the dielectric layer has been increased, such that defects such as delamination and the like may occur.

In particular, since bonding force between a capacitance formation portion and a cover portion is lower than bonding force between the dielectric layer and the internal electrode in the capacitance formation portion, A/C cracking between the capacitance formation portion and the cover portion may occur. When the A/C crack occurs between the capacitance formation portion and the cover portion, a short circuit may occur or a breakdown voltage (BDV) may be lowered, thereby reducing reliability.

Accordingly, there is a need for a method capable of suppressing the A/C crack between the capacitance formation portion and the cover portion.

SUMMARY

An aspect of the present disclosure is to provide a multilayer electronic component having excellent reliability and a method for manufacturing the same.

In addition, another aspect of the present disclosure is to provide a multilayer electronic component in which occurrence of A/C cracking between a capacitance formation portion and a cover portion is suppressed.

However, the aspects of the present disclosure are not limited to the above, and will be more easily understood in the process of describing specific embodiments of the present disclosure.

According to an aspect of the present disclosure, a multilayer electronic component includes a body including a plurality of dielectric layers, a plurality of internal electrodes, a capacitance formation portion in which the plurality of dielectric layers and the plurality of internal electrodes are alternately disposed in a first direction, a first cover portion disposed on one surface of the capacitance formation portion in the first direction and including one of the plurality of dielectric layers, and a second cover portion disposed on the other surface of the capacitance formation portion in the first direction and including one of the plurality of dielectric layers; and an external electrode disposed on the body, wherein, among the plurality of internal electrodes, an internal electrode disposed closest to the first cover portion is referred to as IE1, and a ratio of $Ni(OH)_2$ mass to NiO mass in IE1 is 4.5 or more and 7.5 or less.

According to an aspect of the present disclosure, a multilayer electronic component includes a body including a plurality of dielectric layers, a plurality of internal electrodes, a capacitance formation portion in which the plurality of dielectric layers and the plurality of internal electrodes are alternately disposed in a first direction, a first cover portion disposed on one surface of the capacitance formation portion in the first direction and including one of the plurality of dielectric layers, and a second cover portion disposed on the other surface of the capacitance formation portion in the first direction and including one of the plurality of dielectric layers; and an external electrode disposed on the body, wherein, among the plurality of internal electrodes, an internal electrode disposed closest to the first cover portion is referred to as IE1, and a ratio of a peak value for $Ni(OH)_2$ to a peak value for NiO in a spectrum of IE1 analyzed by X-ray photoelectron spectroscopy (XPS) is 2.46 or more to 3.55 or less.

According to another aspect of the present disclosure, a method of manufacturing a multilayer electronic component, includes preparing a first conductive powder by performing a surface treatment on a metal particle in an oxygen atmosphere; preparing a first ceramic green sheet by applying an internal electrode paste including the first conductive powder to a ceramic green sheet; forming a stack body including stacking, in a first direction, a plurality of the ceramic green sheets including the first ceramic green sheet to form a capacitance formation portion, wherein the ceramic green sheet disposed in an uppermost portion of the capacitance formation portion in the first direction is the first ceramic green sheet, and stacking in upper and lower portions of the stack body in the first direction, respectively, one or more ceramic green sheets, to which the internal electrode paste is not applied, to form cover portions; forming a body including a dielectric layer and an internal electrode by sintering the stack body; and forming an external electrode on the body.

According to an aspect of the present disclosure, a multilayer electronic component includes a body including a plurality of dielectric layers, a plurality of internal electrodes, a capacitance formation portion in which the plurality of dielectric layers and the plurality of internal electrodes are alternately disposed in a first direction, a first cover portion disposed on one surface of the capacitance formation portion in the first direction and including one of the plurality of dielectric layers, and a second cover portion disposed on the other surface of the capacitance formation portion in the first direction and including one of the plurality of dielectric layers; and an external electrode disposed on the body, wherein, among the plurality of internal electrodes, an internal electrode disposed closest to the first cover portion is referred to as IE1, and a ratio of $Ni(OH)_2$ mass to NiO mass in the IE1 is more than 4.30 and less than 8.10.

According to another aspect of the present disclosure, a method of manufacturing a multilayer electronic component, includes preparing a first conductive powder by performing a surface treatment on a metal particle in an oxygen atmosphere; preparing a first ceramic green sheet by applying an internal electrode paste including the first conductive powder to a ceramic green sheet; forming a stack body including stacking, in a first direction, at least two of the first ceramic green sheet; forming a body including a dielectric layer and an internal electrode by sintering the stack body, wherein the internal electrode has a ratio of $Ni(OH)_2$ mass to NiO mass of more than 4.30 and less than 8.10; and forming an external electrode on the body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
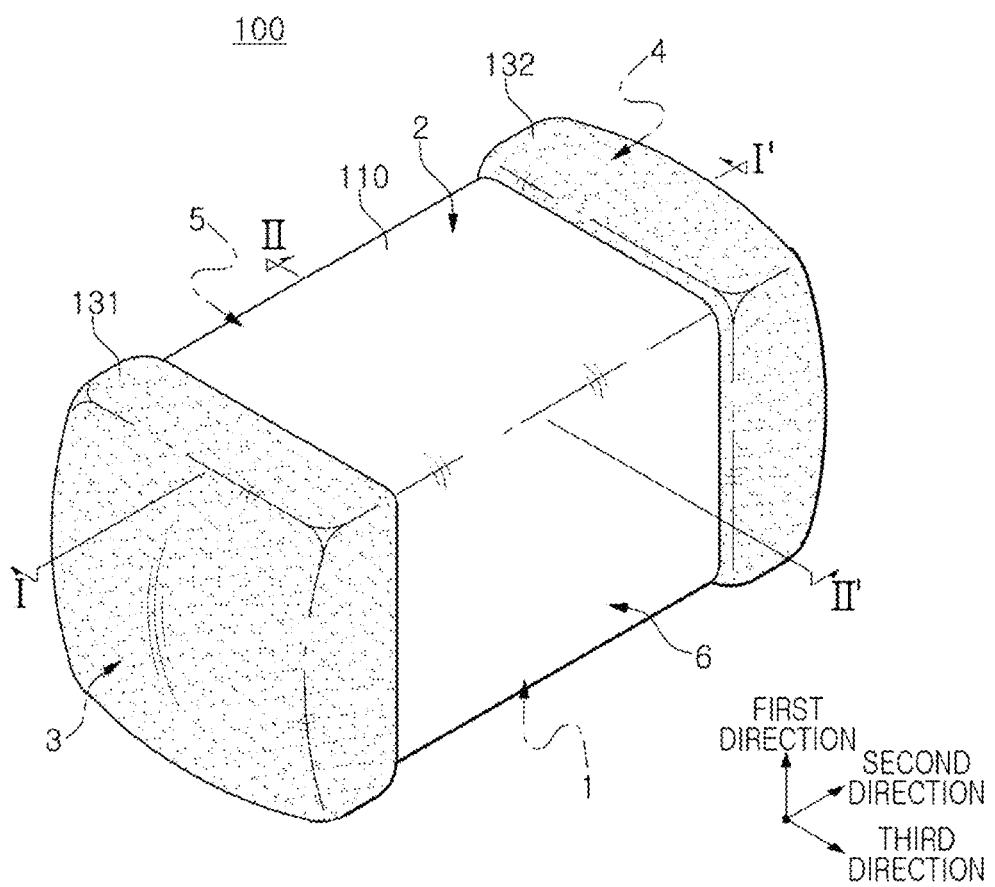
FIG. 1 is a perspective view schematically illustrating a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawings, a first direction may be defined as a stacking direction or a thickness (T) direction, a second direction may be defined as a length (L) direction, and a third direction may be defined as a width (W) direction.

Multilayer Electronic Component

FIG. 1 is a perspective view schematically illustrating a multilayer electronic component according to an embodiment of the present disclosure.

Figure 2:
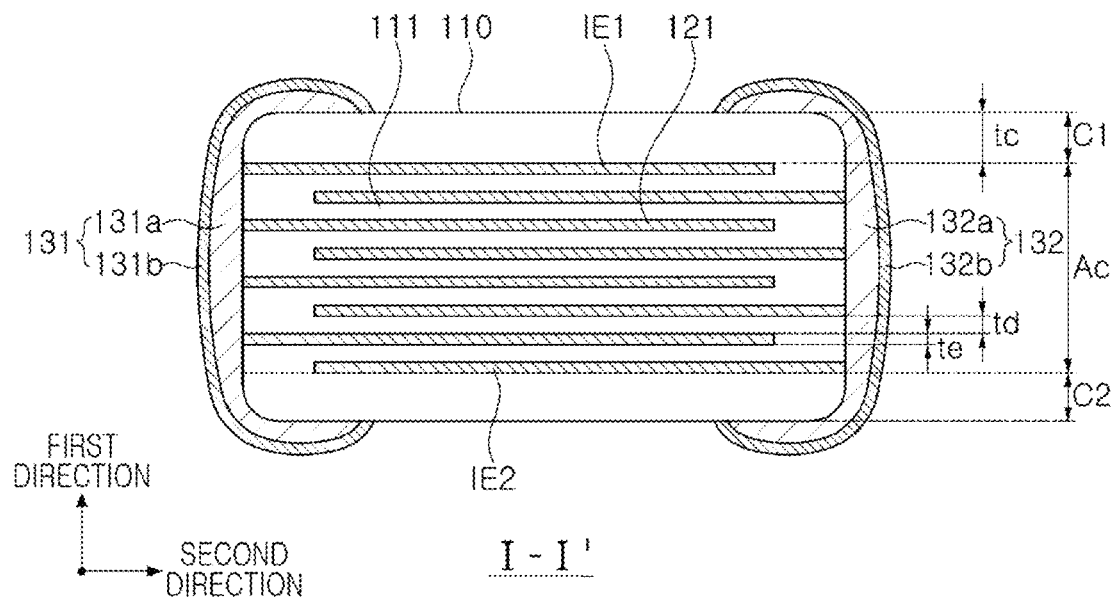
FIG. 2 is a cross-sectional view of FIG. 1, taken along line I-I'.

FIG. 2 is a cross-sectional view of FIG. 1, taken along line I-I'.

Figure 3:
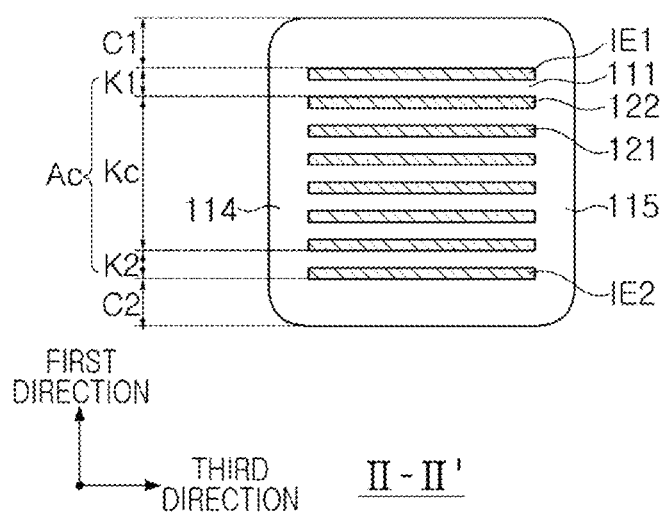
FIG. 3 is a cross-sectional view of FIG. 1, taken along line II-II'.

FIG. 3 is a cross-sectional view of FIG. 1, taken along line II-II'.

Figure 4:
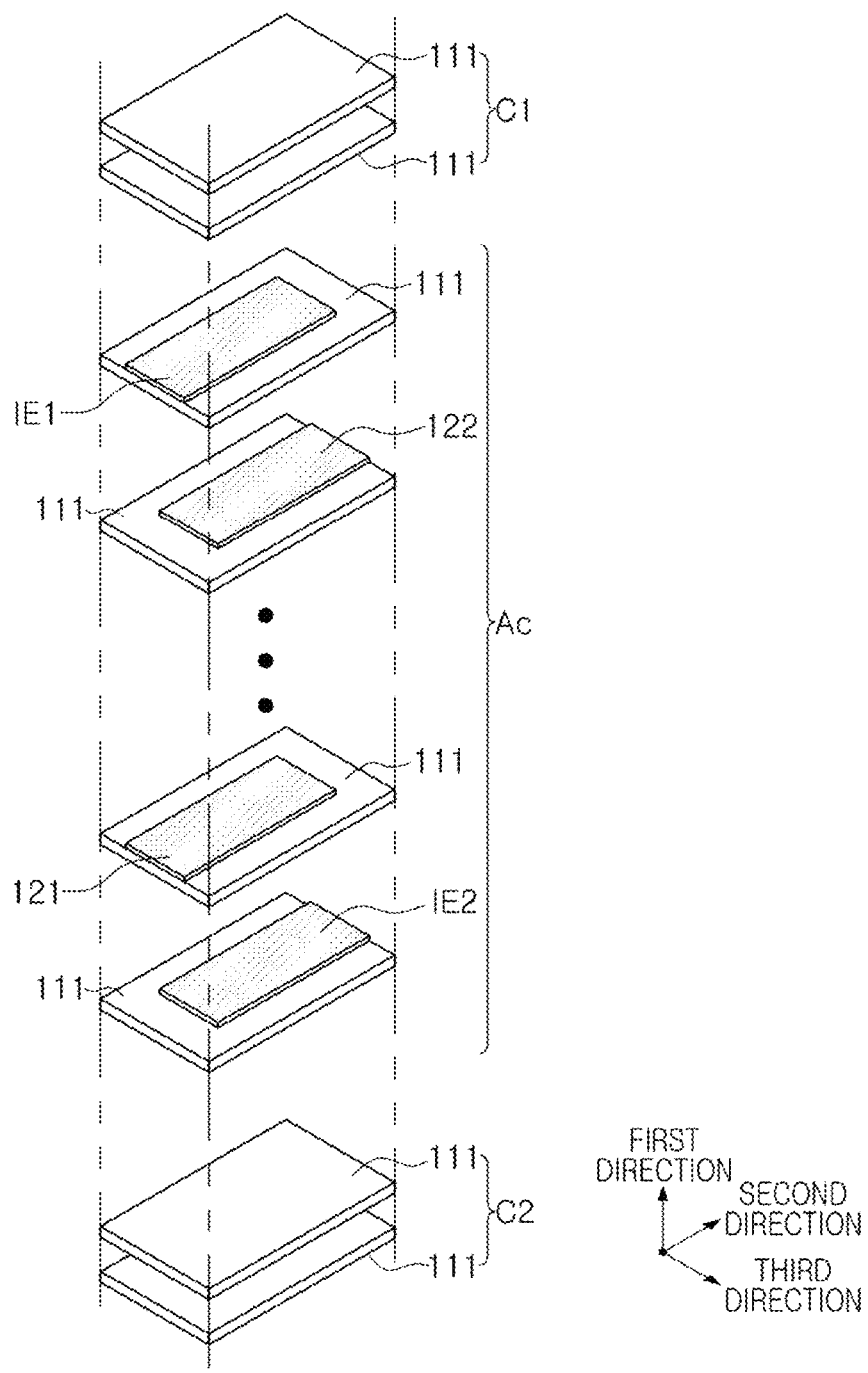
FIG. 4 is an exploded perspective view schematically illustrating a multilayer electronic component according to an embodiment of the present disclosure.

FIG. 4 is an exploded perspective view schematically illustrating a multilayer electronic component according to an embodiment of the present disclosure.

Hereinafter, a multilayer electronic component 100 according to an embodiment of the present disclosure will be described in detail with reference to FIGS. 1 to 4.

A multilayer electronic component 100 according to an embodiment of the present disclosure may include a body 110 including a plurality of dielectric layers 111, a plurality of internal electrodes 121 and 122, a capacitance formation portion Ac in which the plurality of dielectric layers and the plurality of internal electrodes are alternately disposed in a first direction, a first cover portion C1 disposed on one surface of the capacitance formation portion in the first direction and including a dielectric layer, and a second cover portion C2 disposed on the other surface of the capacitance formation portion in the first direction and including a dielectric layer; and an external electrode (e.g., 131 and 132) disposed on the body, wherein, if an internal electrode disposed closest to the first cover portion, among the plurality of internal electrodes, is referred to as IE1, a ratio of $Ni(OH)_2$ mass to NiO mass in IE1 may be 4.5 or more and 7.5 or less.

Since bonding force between the capacitance formation portion Ac and each of the cover portions C1 and C2 is lower than bonding force between the dielectric layer 111 and each of the internal electrodes 121 and 122 in the capacitance formation portion Ac, cracking (hereinafter referred to as 'A/C cracking') between the capacitance formation portion and the cover portions may occur. In addition, the A/C crack may be more likely to occur in a space between the capacitance formation portion Ac and the first cover portion C1 disposed in an upper portion of the body in the first direction, compared to in a space between the capacitance formation portion Ac and the second cover portion C2 disposed in a lower portion of the body in the first direction. This may be due to a difference in pressure received in a stacking process. When the A/C crack occurs, a short circuit may occur or a breakdown voltage (BDV) may be lowered, thereby reducing reliability.

Bonding force between the dielectric layer 111 and each of the internal electrodes 121 and 122 may be most affected by mutual hydrogen bonding due to —H and —OH at an interface therebetween. Therefore, in the present disclosure, a ratio of $Ni(OH)_2$ in an internal electrode IE1 disposed closest to the first cover portion C1 may be increased to increase a ratio of —OH in IE1, the bonding force by the hydrogen bonding may be improved to improve the bonding force between the capacitance formation portion Ac and the first cover portion C1, thereby suppressing occurrence of A/C cracking.

Hereinafter, each configuration of a multilayer electronic component 100 according to an embodiment of the present disclosure will be described in detail.

In the body 110, a dielectric layer 111 and internal electrodes 121 and 122 may be alternately stacked.

Although the specific shape of the body 110 is not particularly limited, the body 110 may have a hexahedral shape or the like, as illustrated. Due to shrinkage of ceramic powder particles included in the body 110 during a sintering process, the body 110 may not have a perfectly straight hexahedral shape, but may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4, and opposing each other in a third direction.

As a margin region in which the internal electrodes 121 and 122 are not disposed overlaps the dielectric layer 111, a step difference may be generated due to thicknesses of the internal electrodes 121 and 122. Therefore, corners connecting the first surface and the third to fifth surfaces, and/or corners connecting the second surface and the third to fifth surfaces may have a shape contracted toward a central portion of the body 110 in the first direction, when viewed based on the first surface or the second surface. Alternatively, due to a shrinkage behavior in a sintering process of the body, corners connecting the first surface 1 and the third to sixth surfaces 3, 4, 5, and 6 and/or corners connecting the second surface 2 and the third to sixth surfaces 3, 4, 5, and 6 may have a shape contracted toward a central portion of the body 110 in the first direction, when viewed based on the first surface or the second surface. Alternatively, as a separate process is performed to round corners connecting each side of the body 110 to prevent chipping defects or the like, the corners connecting the first surface and the third to sixth surfaces and/or the corners connecting the second surface and the third to sixth surfaces may have a round shape.

When, to suppress the step difference due to the internal electrodes 121 and 122, after stacking, the internal electrodes are cut to be exposed from the fifth and sixth surfaces 5 and 6 of the body, and a single dielectric layer or two or more dielectric layers are formed on both side surfaces of the capacitance formation portion Ac in the third direction (the width direction) to form margin portions 114 and 115, a portion connecting the first surface and the fifth and sixth surfaces and a portion connecting the second surface and the fifth and sixth surfaces may not have a contracted shape.

A plurality of dielectric layers 111 forming the body 110 may be in a sintered state, and a boundary between adjacent dielectric layers 111 may be integrated to such an extent that it is difficult to identify the device without using a scanning electron microscope (SEM).

According to an embodiment of the present disclosure, a raw material for forming the dielectric layer 111 is not particularly limited, as long as sufficient capacitance may be obtained. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3(0<x<1)$, $Ba(Ti_{1-y}Ca_y)O_3$ $(0<y<1)$, $(Ba_{1-x}Ca_x)(Ti_{1-y}Zr_y)O_3(0<x<1, 0<y<1)$, or $Ba(Ti_{1-y}Zr_y)O_3(0<y<1)$, in which calcium (Ca), zirconium (Zr), or the like is partially dissolved into $BaTiO_3$, or the like.

In addition, various ceramic additives, organic solvents, plasticizers, binders, dispersants, or the like may be added to the powder of barium titanate ($BaTiO_3$), and the like, as the raw material for forming the dielectric layer 111.

An average thickness td of the dielectric layer 111 does not need to be particularly limited.

In general, when the dielectric layer is thinly formed to have a thickness of less than 0.6 μm, in particular, when a thickness of the dielectric layer is 0.37 μm or less, reliability may be deteriorated.

According to an embodiment of the present disclosure, since the A/C crack may be suppressed by improving the bonding force between the first cover portion C1 and the capacitance formation portion Ac, excellent reliability may be secured, even when the average thickness of the dielectric layer 111 is 0.37 μm or less.

Therefore, when the average thickness of the dielectric layer 111 is 0.37 μm or less, the reliability improvement effect according to the present disclosure may be more remarkable.

The average thickness td of the dielectric layer 111 may mean an average thickness of the dielectric layer 111 disposed between the first and second internal electrodes 121 and 122.

The average thickness of the dielectric layer 111 may be determined by scanning images of cross-sections of the body 110 in the length and thickness directions (an L-T plane) with a scanning electron microscope (SEM) with a magnification of 10,000. More specifically, the average value may be determined by measuring thicknesses of one dielectric layer at thirty (30) equally spaced points in the length direction in the scanned images. The thirty (30) equally spaced points may be designated in the capacitance formation portion Ac. In addition, when the average value is determined by reflecting expansively the measurement of the average value to ten (10) dielectric layers, the average thickness of the dielectric layers may be more generalized.

The body 110 may include a plurality of dielectric layers 111, a plurality of internal electrodes 121 and 122, a capacitance formation portion Ac in which the dielectric layers and the internal electrodes are alternately disposed in the first direction, a first cover portion C1 disposed on one surface of the capacitance formation portion Ac in the first direction and including a dielectric layer, and a second cover portion C2 disposed on the other surface of the capacitance formation portion Ac in the first direction and including a dielectric layer.

The capacitance formation portion Ac may be a portion contributing to capacitance formation of a capacitor, and may be formed by repeatedly stacking the plurality of first and second internal electrode layers 121 and 122 with the dielectric layer 111 interposed therebetween.

The first cover portion C1 and the second cover portion C2 may be formed by stacking the single dielectric layer 111 or the two or more dielectric layers 111 on upper and lower surfaces of the capacitance formation portion Ac, respectively, in the thickness direction, and may basically play a role in preventing damage to the internal electrodes due to physical or chemical stress.

The first cover portion C1 and the second cover portion C2 may not include internal electrodes, and may include the same material as the dielectric layer 111 of the capacitance formation portion Ac. The dielectric layers of the cover portions C1 and C2 and the dielectric layer 111 of the capacitance formation portion Ac may not be necessarily limited to the same material, and may include different materials, as necessary. For example, the first cover portion C1 and the second cover portion C2 may include a ceramic material, for example, a barium titanate ($BaTiO_3$)-based ceramic material.

An average thickness tc of each of the cover portions C1 and C2 does not need to be particularly limited. To more easily achieve the demand for decreasing the size and increasing the capacity of the multilayer electronic component, the average thickness tc of each of the cover portions C1 and C2 may be 15 μm or less. For example, the average thickness tc of the first cover portion C1 may be 15 μm or less, and the average thickness tc of the second cover portion C2 may also be 15 μm or less. In addition, according to an embodiment of the present disclosure, since it is possible to suppress A/C cracking by improving the bonding force between the first cover portion C1 and the capacitance formation portion Ac, excellent reliability may be secured, even when the average thickness tc of each of the cover portions C1 and C2 is 15 μm or less.

The average thickness tc of each of the cover portions C1 and C2 may mean a distance in the first direction, and may be an average of distances of each of the cover portions C1 and C2, measured at five (5) equally spaced points above or below the capacitance formation portion Ac in the first direction. The average thickness tc of each of the cover portions C1 and C2 may be determined by scanning images of cross-sections of the body 110 in the length and thickness directions (an L-T plane) with a scanning electron microscope (SEM) with a magnification of 10,000. Other methods and/or tools appreciated by one of ordinary skill in the art, even if not described in the present disclosure, may also be used.

In addition, margin portions 114 and 115 may be disposed on side surfaces of the capacitance formation portion Ac.

The margin portions 114 and 115 may include a first margin portion 114 disposed on the fifth surface 5 of the body 110 and a second margin portion 115 disposed on the sixth surface 6 of the body 110. For example, the margin portions 114 and 115 may be disposed on both end surfaces of the body 110 in the width direction.

As illustrated in FIG. 3, the margin portions 114 and 115 may refer to regions between both ends of the first and second internal electrodes 121 and 122, and an external surface of the body 110, in a cross-section of the body 110 cut in width-thickness (WT) directions.

The margin portions 114 and 115 may basically play a role in preventing damage to the internal electrodes due to physical or chemical stress.

The margin portions 114 and 115 may be prepared by forming the internal electrodes by applying a conductive paste to a ceramic green sheet, except for a portion in which the margin portions are formed.

Alternatively, to suppress a step difference caused by the internal electrodes 121 and 122, after stacking, the internal electrodes may be cut to be exposed from the fifth and sixth surfaces 5 and 6 of the body 110, and then a single dielectric layer or two dielectric layers may be stacked on both lateral surfaces of the capacitance formation portion Ac in the third direction (the width direction), to form margin portions 114 and 115.

Widths of the margin portions 114 and 115 does not need to be particularly limited. To more easily achieve the demand for decreasing the size and increasing the capacity of the multilayer electronic component, an average width of each of the margin portions 114 and 115 may be 15 μm or less. In addition, according to an embodiment of the present disclosure, since it is possible to suppress A/C cracking by improving the bonding force between the first cover portion C1 and the capacitance formation portion Ac, excellent reliability may be secured, even when the average width of each of the margin portions 114 and 115 is 15 μm or less.

The average width of each of the margin portions 114 and 115 may mean an average of distances of each of the margin portions 114 and 115 in the third direction, and may be a value obtained by averaging the margin portions 114 and 115, measured at five (5) equally spaced points from side surfaces of the capacitance formation portion Ac in the third direction.

The internal electrodes 121 and 122 may be alternately stacked with the dielectric layer 111.

The internal electrodes may include a first internal electrode 121 and a second internal electrode 122. The first and second internal electrodes 121 and 122 may be alternately disposed to oppose each other with the dielectric layer 111, constituting the body 110, interposed therebetween, and may be exposed from the third and fourth surfaces 3 and 4 of the body 110, respectively.

The first internal electrode 121 may be spaced apart from the fourth surface 4 and may be exposed from the third surface 3, and the second internal electrode 122 may be spaced apart from the third surface 3 and may be exposed from the fourth surface 4. A first external electrode 131 may be disposed on the third surface 3 of the body to be connected to the first internal electrode 121, and a second external electrode 132 may be disposed on the fourth surface 4 of the body to be connected to the second internal electrode 122.

For example, the first internal electrode 121 may not be connected to the second external electrode 132, but may be connected to the first external electrode 131, and the second internal electrode 122 may not be connected to the first external electrode 131, but may be connected to the second external electrode 132. Therefore, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

According to an embodiment of the present disclosure, if an internal electrode disposed closest to the first cover portion C1, among the plurality of internal electrodes 121 and 122, is referred to as IE1, a ratio of $Ni(OH)_2$ mass to NiO mass in IE1 may be 4.5 or more and 7.5 or less.

Bonding force between the dielectric layer 111 and each of the internal electrodes 121 and 122 may be most affected by mutual hydrogen bonding due to —H and —OH at an interface therebetween. In this case, —OH may be included in $Ni(OH)_2$ of each of the internal electrodes, and —H may be disposed on a surface of the dielectric layer. This is because —H may not be included in a material forming the dielectric layer, but —H may be disposed on a portion of the surface of the dielectric layer by reacting with a trace amount of moisture in air.

When a hydrogen (H) atom is covalently bonded to an atom with strong electronegativity such as nitrogen (N), oxygen (O), fluorine (F), or the like, the atom with strong electronegativity may have a partial negative (−) charge and the hydrogen atom may have a partial positive (+) charge. When the atom with strong electronegativity is adjacent to such a hydrogen atom, an electrostatic attraction may be generated between these two atoms, which is called a hydrogen bond. The hydrogen bonding is not a chemical bond between atoms, but an interaction (e.g., an intermolecular interaction) between molecules, and may have a much stronger bonding force, compared to an interaction between molecules, which is other polar attraction, such as dispersion force, dipole-dipole force, and dipole-induced dipole force. Since —OH of the internal electrode has a partial negative charge and —H of the dielectric layer has a partial positive charge, the bonding force between the dielectric layer 111 and each of the internal electrodes 121 and 122 may be improved.

As the ratio of $Ni(OH)_2$ mass to NiO mass in IE1 satisfies 4.5 or more and 7.5 or less (or the ratio is more than 4.30 and less than 8.10), a hydrogen binding force between the dielectric layer of the first cover portion C1 and IE1 may be maximally secured. Therefore, bonding force between the capacitance formation portion Ac and the first cover portion C1 may be improved to suppress occurrence of A/C cracking.

When the ratio of $Ni(OH)_2$ mass to NiO mass in IE1 is less than 4.5 or is 4.3 or less, an —OH ratio may be insufficient, and thus an effect of improving the bonding force between the capacitance formation portion Ac and the first cover portion C1 may be insufficient.

When the ratio of $Ni(OH)_2$ mass to NiO mass in IE1 exceeds 7.5 or is 8.10 or more, the —OH ratio may increase than necessary, and the bonding force between the capacitance formation portion Ac and the first cover portion C1 may be rather reduced. When the —OH ratio is too high, the bonding force between the capacitance formation portion Ac and the first cover portion C1 may be improved due to the hydrogen binding force, but hydrophilicity may too increase to increase possibility of moisture penetration, and the bonding force may be lowered.

Therefore, the ratio of $Ni(OH)_2$ mass to NiO mass in IE1 may be 4.5 or more and 7.5 or less, and more preferably, the ratio of $Ni(OH)_2$ mass to NiO mass in IE1 may be 4.88 or more and 7.07 or less.

In an embodiment, a ratio of $Ni(OH)_2$ mass to NiO mass in at least one internal electrode, among the plurality of internal electrodes 121 and 122, may be 3.0 or less.

As the at least one internal electrode, among the plurality of internal electrodes 121 and 122, has a ratio of $Ni(OH)_2$ mass to NiO mass of 3.0 or less, stress may be dispersed by reducing a difference between bonding force between an dielectric layer in the capacitance formation portion Ac and each of the internal electrodes, and bonding force between the capacitance formation portion Ac and the first cover portion C1. Therefore, A/C cracking may be more effectively suppressed.

The present disclosure is not limited thereto, and it should be noted that a case in which a ratio of $Ni(OH)_2$ mass to NiO mass in all of the plurality of internal electrodes 121 and 122 satisfies 4.5 or more and 7.5 or less is not excluded from the present disclosure.

In an embodiment, a ratio of the number of internal electrodes having a ratio of $Ni(OH)_2$ mass to NiO mass of 3.0 or less, among the plurality of internal electrodes (e.g., to a total number of internal electrodes in the plurality of internal electrodes), may be 90% or more and less than 100%. Therefore, a difference between bonding force between the dielectric layer in the capacitance formation portion Ac and the internal electrode, and bonding force between the capacitance formation portion Ac and the first cover portion C1 may be further reduced to disperse stress, thereby suppressing occurrence of cracking more effectively. The number of internal electrodes having a ratio of $Ni(OH)_2$ mass to NiO mass of 3.0 or less may be obtained by counting the number of internal electrodes having the ratio of $Ni(OH)_2$ mass to NiO mass of 3.0 or less as determined using X-ray photoelectron spectroscopy (XPS) disclosed herein. Other methods and/or tools appreciated by one of ordinary skill in the art, even if not described in the present disclosure, may also be used.

In an embodiment, if an internal electrode disposed closest to the second cover portion C2 is referred to as IE2, a ratio of $Ni(OH)_2$ mass to NiO mass in IE2 may be 4.5 or more and 7.5 or less or may be more than 4.30 and less than 8.10.

Therefore, since a hydrogen binding force between the dielectric layer of the second cover portion C2 and IE2 may be maximally secured, bonding force between the capacitance formation portion Ac and the second cover portion C2 may be improved to suppress occurrence of A/C cracking. More preferably, a ratio of $Ni(OH)_2$ mass to NiO mass in IE2 may be 4.88 or more and 7.07 or less.

In an embodiment, if a region of the capacitance formation portion adjacent to the first cover portion is referred to as K1, a region of the capacitance formation portion adjacent to the second cover portion is referred to as K2, and a region disposed between K1 and K2 is referred to as Kc, a ratio of $Ni(OH)_2$ mass to NiO mass in internal electrodes included in K1 and K2 may be 4.5 or more and 7.5 or less, and a ratio of $Ni(OH)_2$ mass to NiO mass in an internal electrode included in Kc may be 3.0 or less.

Since internal electrodes included in the regions K1 and K2 adjacent to the first and second cover portions have a greater effect on the bonding force between the cover portions C1 and C2 and the capacitance formation portion Ac, compared to internal electrodes included in Kc, a ratio of $Ni(OH)_2$ mass to NiO mass in internal electrodes included in K1 and K2 may be 4.5 or more and 7.5 or less, and a ratio of $Ni(OH)_2$ mass to NiO mass in an internal electrode included in Kc may be 3.0 or less. Therefore, A/C cracking may be suppressed more effectively.

In this case, a ratio of a maximum distance of Kc in the first direction to a maximum distance of the capacitance formation portion in the first direction may be 0.9 or more and less than 1.0, and K1 and K2 may include at least one internal electrode in which a ratio of $Ni(OH)_2$ mass to NiO mass is 4.5 or more and 7.5 or less. Therefore, a difference between bonding force between the dielectric layer in the capacitance formation portion Ac and the internal electrode, and bonding force between the capacitance formation portion Ac and the cover portions C1 and C2 may be further reduced to disperse stress, thereby suppressing occurrence of cracking more effectively. The maximum distance of Kc in the first direction and the maximum distance of the capacitance formation portion in the first direction may be determined by scanning images of cross-sections of the body 110 in the length and thickness directions (an L-T plane) with a scanning electron microscope (SEM) with a magnification of 10,000. The maximum distances of Kc and the capacitance formation portion in the first direction may be respectively determined by measuring the distances (lengths) of Kc and the capacitance formation portion at thirty (30) equally spaced points in the length direction in the scanned images and selecting the respective maximum distances among the measurements. Other methods and/or tools appreciated by one of ordinary skill in the art, even if not described in the present disclosure, may also be used.

A method of controlling a ratio of $Ni(OH)_2$ mass to NiO mass in an internal electrode to have 4.5 or more and 7.5 or less is not particularly limited. For example, a ratio of $Ni(OH)_2$ mass to NiO mass in an internal electrode may be controlled by forming the internal electrode using a conductive powder 21 including a metal particle 21a and a shell 21b containing $Ni(OH)_2$ disposed on a surface of the metal particle. In some embodiments, the internal electrode may include a conductive particle including a metal particle and $Ni(OH)_2$ disposed on at least a portion of a surface of the metal particle.

In this case, the conductive powder 21 including a metal particle 21a and a shell 21b containing $Ni(OH)_2$ disposed on a surface of the metal particle may be obtained by performing a physical oxygen adsorption process on the metal particle 21a in an oxygen-excessive atmosphere. In addition, as the physical oxygen adsorption process, a sputtering method or a barrel type sputtering method may be used.

The internal electrodes 121 and 122 may further include nickel (Ni), in addition to NiO and $Ni(OH)_2$, and one or more of nickel (Ni), copper (Cu), palladium (Pd), silver (Ag), gold (Au), platinum (Pt), tin (Sn), tungsten (W), titanium (Ti), and alloys thereof may be further included.

In an embodiment, one or more of IE1 and IE2 may further include a ceramic additive. As one or more of IE1 and IE2 include the ceramic additive, mismatch in shrinkage behavior between the cover portions C1 and C2 and the dielectric layer may be reduced to improve the bonding force between the capacitance formation portion Ac and the cover portions C1 and C2. A type of the ceramic additive is not particularly limited, and may be the same type of ceramic as a ceramic included in the dielectric layer.

In an embodiment, the internal electrodes 121 and 122 may further include a ceramic additive. As the internal electrode include the ceramic additive, mismatch in shrinkage behavior between the dielectric layer and the internal electrode may be reduced to suppress delamination between the dielectric layer and the internal electrode.

A method of measuring a ratio of $Ni(OH)_2$ mass to NiO mass in an internal electrode does not need to be particularly limited. For example, the ratio of $Ni(OH)_2$ mass to NiO mass in the internal electrode may be a ratio S1/S2 of an area S2 of a spectrum by (corresponding to) $Ni(OH)_2$ to an area S1 of a spectrum by (corresponding to) NiO in a spectrum of the internal electrode analyzed by X-ray photoelectron spectroscopy (XPS).

The X-ray photoelectron spectroscopy (XPS) may be a type of electron spectroscopy that analyzes a composition and a chemical state of a measurement target, and may analyze identification and a chemical state of elements by measuring energy distribution of photoelectrons emitted from atoms by a photoelectric effect, specifically, a kinetic energy of photoelectrons excited by X-rays, to obtain a difference between an energy of the X-rays and the kinetic energy, i.e., a bound energy, when the X-rays are irradiated to an internal electrode.

Figure 6:
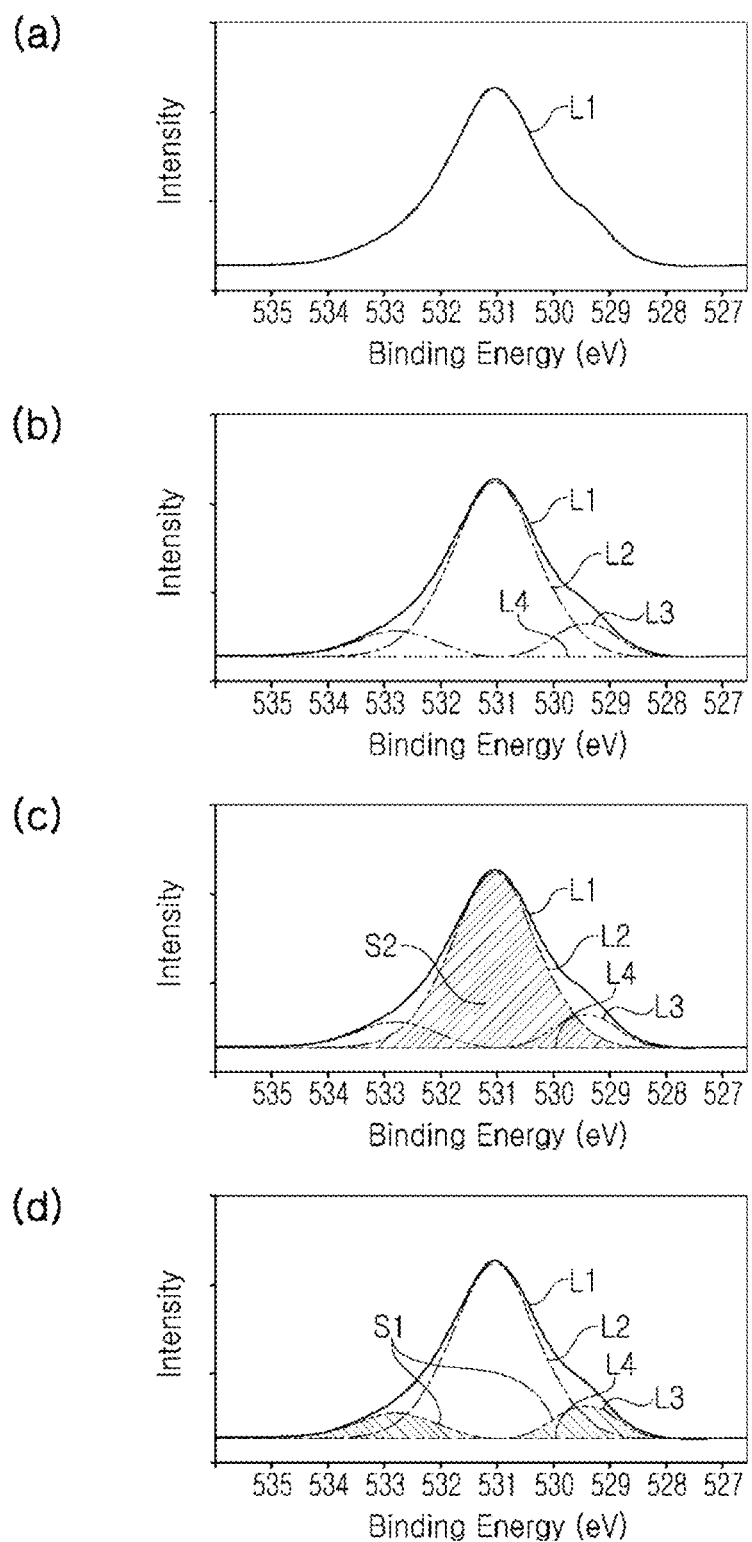
In FIG. 6, as a spectrum of IE1 of Test No. 12 analyzed by X-ray photoelectron spectroscopy (XPS), portion (a) thereof is a graph illustrating a spectrum before peak separation, portion (b) thereof is a graph illustrating a spectrum after peak separation, portion (c) thereof is a graph illustrating an area of a spectrum by $Ni(OH)_2$, and portion (d) thereof is a graph illustrating an area of a spectrum by MiC.

Specifically, as a device for the X-ray photoelectron spectroscopy, Thermo Fisher Scientific X-ray photoelectron spectroscopy was used, and in a cross-section cut in the first and third directions from a central portion of the body 110 in the second direction, a spectrum L1 as illustrated in portion (a) of FIG. 6 may be obtained by irradiating X-rays at a center point of IE1 in the first and third directions. Thereafter, the spectrum L1 may be separated by peaks in a manner that integrates an entire area of a spectrum L2 by (corresponding to) $Ni(OH)_2$ and a spectrum L3 by (corresponding to) NiO using Avantage program, to obtain spectra as illustrated in portion (b) of FIG. 6. In this case, L4 may be a baseline used for separating the XPS peak. An area of a shaded portion illustrated in portion (c) of FIG. 6 may be an area S2 of the spectrum by (corresponding to) $Ni(OH)_2$, and an area of a shaded portion illustrated in portion (d) of FIG. 6 may be an area S1 of the spectrum by (corresponding to) NiO. A value of [S2/S1] may correspond to [$Ni(OH)_2$ mass/NiO mass], and may refer to a ratio of $Ni(OH)_2$ mass to NiO mass.

The ratio of $Ni(OH)_2$ mass to NiO mass for the other internal electrodes (e.g., internal electrodes in the capacitance formation portion, and IE2) may be measured using the above method.

An average thickness to of each of the internal electrodes 121 and 122 does not need to be particularly limited.

When each of the internal electrodes is generally thinly formed to have a thickness of less than 0.6 μm, in particular, when a thickness of each of the internal electrodes is 0.35 μm or less, reliability may be deteriorated.

According to an embodiment of the present disclosure, since it is possible to suppress A/C cracking by improving the bonding force between the first cover portion C1 and the capacitance formation portion Ac, excellent reliability may be secured, even when the average thickness of each of the internal electrodes 121 and 122 is 0.35 μm or less.

Therefore, when each of the internal electrodes 121 and 122 has an average thickness of 0.35 μm or less, an effect according to the present disclosure may be more remarkable, and miniaturization and high capacity of a multilayer electronic component may be more easily achieved.

The average thickness to of each of the internal electrodes 121 and 122 may mean an average thickness of each of the internal electrodes 121 and 122.

The average thickness of each of the internal electrodes 121 and 122 may be determined by scanning images of cross-sections of the body 110 in the length and thickness directions (an L-T plane) with a scanning electron microscope (SEM) with a magnification of 10,000. More specifically, the average value may be determined by measuring thicknesses of one internal electrode at thirty (30) equally spaced points in the length direction in the scanned images. The thirty (30) equally spaced points may be designated in the capacitance formation portion Ac. In addition, when the average value is determined by reflecting expansively the measurement of the average value to ten (10) internal electrodes, the average thickness of the internal electrodes may be more generalized.

The external electrodes 131 and 132 may be disposed on the third surface 3 and the fourth surface 4 of the body 110, respectively. The external electrodes 131 and 132 may include first and second external electrodes 131 and 132 respectively disposed on the third and fourth surfaces 3 and 4 of the body 110 and respectively connected to the first and second internal electrodes 121 and 122. In this case, the external electrodes 131 and 132 may include a bend portion arranged to extend to one or more of the first, second, fifth, and sixth surfaces of the body 110.

Although a structure in which the multilayer electronic component 100 has two external electrodes 131 and 132 is described in the present embodiment, the number, a shape, or the like of the external electrodes 131 and 132 may be changed, depending on a shape of the internal electrodes 121 and 122 or other purposes.

The external electrodes 131 and 132 may be formed using various materials having electrical conductivity such as metal or the like, and a specific material may be determined in consideration of electrical characteristics, structural stability, or the like, and furthermore, may have a multi-layered structure.

For example, the external electrodes 131 and 132 may include electrode layers 131a and 132a disposed on the body 110 and plating layers 131b and 132b formed on the electrode layers 131a and 132a.

As a more specific example of the electrode layers 131a and 132a, the electrode layers 131a and 132a may be a sintered electrode including a conductive metal and glass, or a resin-based electrode including a conductive metal and a resin.

In addition, the electrode layers 131a and 132a may have a form in which a sintered electrode and a resin-based electrode are sequentially formed on a body. Also, the electrode layers 131a and 132a may be formed by transferring a sheet including a conductive metal onto the body or by transferring a sheet including a conductive metal onto the sintered electrode.

As the conductive metal included in the electrode layers 131a and 132a, a material having excellent electrical conductivity may be used, and the material is not particularly limited. For example, the conductive metal may be at least one of nickel (Ni), copper (Cu), or alloys thereof.

The plating layers 131b and 132b serve to improve mounting characteristics. Types of the plating layers 131b and 132b are not particularly limited, and may be a plating layer including at least one of Ni, Sn, Pd, or alloys thereof, and may be formed as a plurality of layers.

As a more specific example of the plating layers 131b and 132b, the plating layers 131b and 132b may be an Ni plating layer or an Sn plating layer. The electrode layers 131a and 132a may have a form in which the Ni plating layer and the Sn plating layer are sequentially formed on the electrode layer, and may have a form in which the Sn plating layer, the Ni plating layer, and the Sn plating layer are sequentially formed on the electrode layer. In addition, the plating layers 131b and 132b may include a plurality of Ni plating layers and/or a plurality of Sn plating layers.

A size of the multilayer electronic component 100 does not need to be particularly limited.

To achieve miniaturization and high capacity at the same time, it may be necessary to increase the number of stacks by reducing a thickness of a dielectric layer and a thickness of an internal electrode. In a multilayer electronic component 100 having a size of 0603 (length×width, 0.6 mm×0.3 mm) or less, effects of improving reliability and insulation resistance according to the present disclosure may be more remarkable.

Therefore, in consideration of manufacturing errors external electrode sizes, or the like, when a length of the multilayer electronic component 100 is 0.66 mm or less and a width thereof is 0.33 mm or less, the reliability improvement effect according to the present disclosure may be more remarkable. In this case, the length of the multilayer electronic component 100 means a maximum distance of the multilayer electronic component 100 in the second direction, and the width of the multilayer electronic component 100 means a maximum distance of the multilayer electronic component 100 in the third direction. The length and width of the multilayer electronic component 100 may be determined using an optical microscope. Other methods and/or tools appreciated by one of ordinary skill in the art, even if not described in the present disclosure, may also be used.

A multilayer electronic component according to an embodiment of the present disclosure will be described in detail. Contents overlapping the above-described multilayer electronic component, according to an embodiment of the present disclosure, will be omitted.

A multilayer electronic component 100 according to an embodiment of the present disclosure may include a body 110 including a plurality of dielectric layers 111, a plurality of internal electrodes 121 and 122, a capacitance formation portion Ac in which the plurality of dielectric layers and the plurality of internal electrodes are alternately disposed in a first direction, a first cover portion C1 disposed on one surface of the capacitance formation portion in the first direction and including a dielectric layer, and a second cover portion C2 disposed on the other surface of the capacitance formation portion in the first direction and including a dielectric layer; and an external electrode (e.g., 131 and 132) disposed on the body, wherein, if an internal electrode disposed closest to the first cover portion, among the plurality of internal electrodes, is referred to as IE1, a ratio of a peak value for $Ni(OH)_2$ to a peak value for NiO in a spectrum of IE1 analyzed by X-ray photoelectron spectroscopy (XPS) may be 2.46 or more to 3.55 or less.

As a ratio of a peak value for $Ni(OH)_2$ to a peak value for NiO in a spectrum of IE1 satisfies 2.46 or more and 3.55 or less (or satisfies more than 2.06 and less than 4.06), a hydrogen binding force between the dielectric layer of the first cover portion C1 and IE1 may be maximally secured. Therefore, bonding force between the capacitance formation portion Ac and the first cover portion C1 may be improved to suppress occurrence of A/C cracking.

When a ratio of a peak value for $Ni(OH)_2$ to a peak value for NiO in a spectrum of IE1 is less than 2.46 or is 2.06 or less, an —OH ratio may be insufficient, and thus an effect of improving the bonding force between the capacitance formation portion Ac and the first cover portion C1 may be insufficient. When a ratio of a peak value for $Ni(OH)_2$ to a peak value for NiO in a spectrum of IE1 is more than 3.55 or is 4.06 or more, the —OH ratio may increase than necessary, and the bonding force between the capacitance formation portion Ac and the first cover portion C1 may be rather reduced.

In this case, in IE1, the peak value for NiO may be 8400 or more and 11000 or less, and the peak value for $Ni(OH)_2$ may be 27100 or more and 32800 or less.

In an embodiment, a ratio of a peak value for $Ni(OH)_2$ to a peak value for NiO in at least one internal electrode, analyzed by X-ray photoelectron spectroscopy (XPS), among the plurality of internal electrodes 121 and 122, may be 0.83 or less.

As a ratio of a peak value for $Ni(OH)_2$ to a peak value for NiO in the at least one internal electrode, among the plurality of internal electrodes 121 and 122, satisfies 0.83 or less, stress may be dispersed by reducing a difference between bonding force between an dielectric layer in the capacitance formation portion Ac and each of the internal electrodes, and bonding force between the capacitance formation portion Ac and the first cover portion C1. Therefore, A/C cracking may be more effectively suppressed.

In this case, at least one of the plurality of internal electrodes 121 and 122 may have a peak value of NiO of 28100 or more and a peak value of $Ni(OH)_2$ of 23200 or less.

In an embodiment, if, in a graph analyzed by the X-ray photoelectron spectroscopy, an area of a spectrum by (corresponding to) NiO is referred to as S1 and an area of a spectrum by (corresponding to) $Ni(OH)_2$ is referred to as S2, IE1 may satisfy $4.88 \leq S2/S1 \leq 7.07$. Therefore, as the ratio of $Ni(OH)_2$ mass to NiO mass in IE1 satisfies 4.5 or more and 7.5 or less, a hydrogen binding force between the dielectric layer of the first cover portion C1 and IE1 may be maximally secured. Therefore, bonding force between the capacitance formation portion Ac and the first cover portion C1 may be improved to suppress occurrence of A/C cracking.

In this case, S1 of IE1 may be 11.4 or more and 15.0 or less, and S2 of IE1 may be 73.2 or more and 88.8 or less.

In an embodiment, if an internal electrode disposed closest to the second cover portion is referred to as IE2, a ratio of a peak value for $Ni(OH)_2$ to a peak value for NiO in a spectrum of IE2 analyzed by X-ray photoelectron spectroscopy (XPS) may be 2.46 or more and 3.55 or less or more than 2.06 and less than 4.06.

Therefore, since a hydrogen binding force between the dielectric layer of the second cover portion C2 and IE2 may be maximally secured, bonding force between the capacitance formation portion Ac and the second cover portion C2 may be improved to suppress occurrence of A/C cracking.

In an embodiment, if a region of the capacitance formation portion adjacent to the first cover portion is referred to as K1, a region of the capacitance formation portion adjacent to the second cover portion is referred to as K2, and a region disposed between K1 and K2 is referred to as Kc, a ratio of a peak value for $Ni(OH)_2$ to a peak value for NiO in a spectrum of internal electrodes included in K1 and K2 analyzed by X-ray photoelectron spectroscopy (XPS) may be 2.46 or more and 3.55 or less, and a ratio of a peak value for $Ni(OH)_2$ to a peak value for NiO in a spectrum of an internal electrode included in Kc analyzed by X-ray photoelectron spectroscopy (XPS) may be 0.83 or less.

Since internal electrodes included in the regions K1 and K2 adjacent to the first and second cover portions have a greater effect on the bonding force between the cover portions C1 and C2 and the capacitance formation portion Ac, compared to internal electrodes included in Kc, a ratio of a peak value for $Ni(OH)_2$ to a peak value for NiO in a spectrum of internal electrodes included in K1 and K2 analyzed by X-ray photoelectron spectroscopy (XPS) may be 2.46 or more and 3.55 or less, and a ratio of a peak value for $Ni(OH)_2$ to a peak value for NiO in a spectrum of an internal electrode included in Kc analyzed by X-ray photoelectron spectroscopy (XPS) satisfies 0.83 or less. Therefore, A/C cracking may be suppressed more effectively.

In this case, a ratio of a maximum distance of Kc in the first direction to a maximum distance of the capacitance formation portion in the first direction may be 0.9 or more, and K1 and K2 may include at least one internal electrode in which a ratio of a peak value for $Ni(OH)_2$ to a peak value for NiO in a spectrum analyzed by X-ray photoelectron spectroscopy (XPS) is 2.46 or more and 3.55 or less. Therefore, a difference between bonding force between the dielectric layer in the capacitance formation portion Ac and the internal electrode, and bonding force between the capacitance formation portion Ac and the cover portions C1 and C2 may be further reduced to disperse stress, thereby suppressing occurrence of cracking more effectively.

Method of Manufacturing Multilayer Electronic Component

Figure 9:
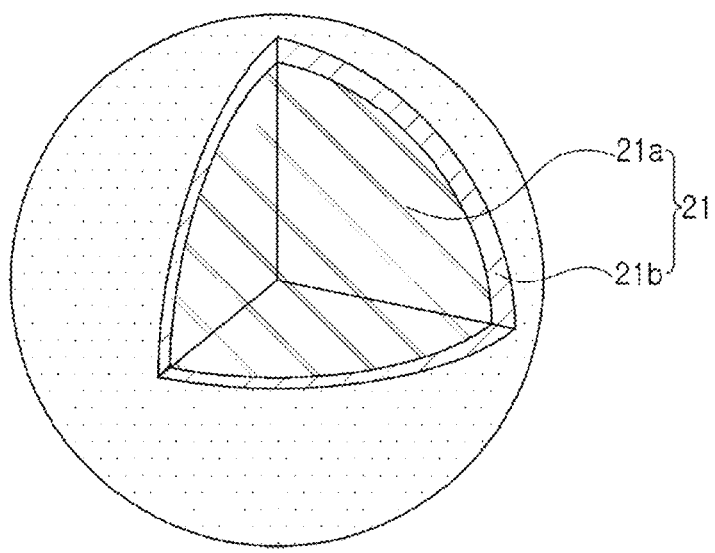
FIG. 9 illustrates a first conductive powder.
Figure 10:
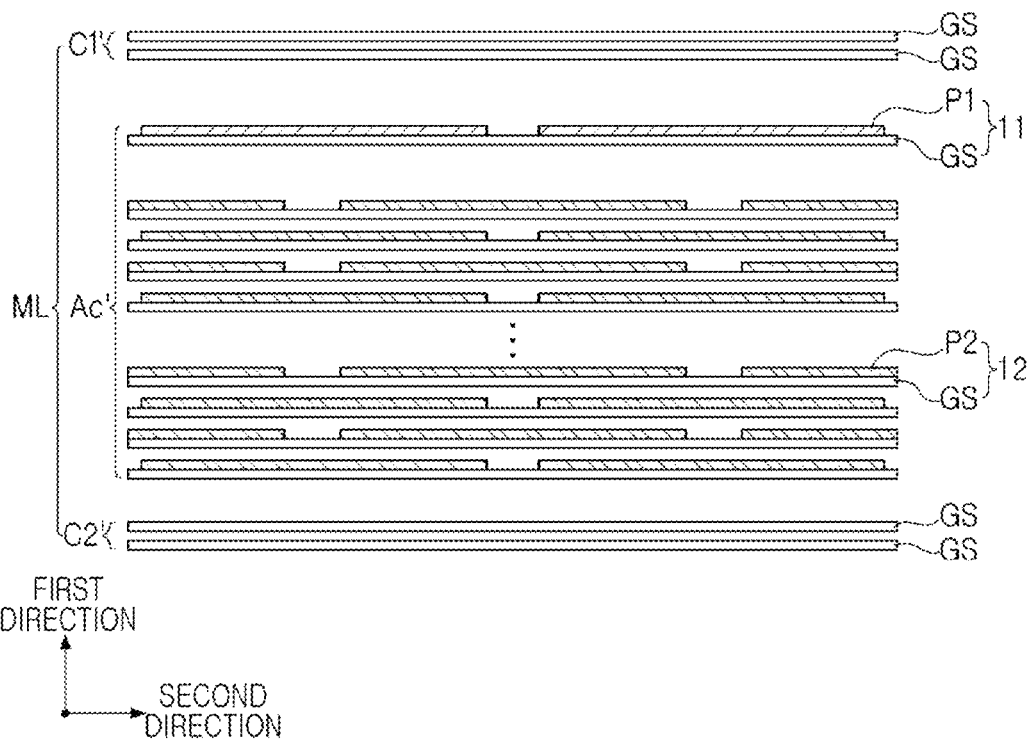
FIG. 10 is a view illustrating a process of forming a stack body according to an embodiment of the present disclosure.

FIG. 9 illustrates a first conductive powder. FIG. 10 is a view illustrating a process of forming a stack body according to an embodiment of the present disclosure.

A method of manufacturing a multilayer electronic component, capable of easily manufacturing the multilayer electronic component 100, according to an embodiment of the present disclosure described above with reference to FIGS. 9 and 10, will be described.

A multilayer electronic component 100 according to an embodiment of the present disclosure, described above, is not limited to the method described below. In addition, content overlapping those described above will be omitted to avoid duplicate description.

A method of manufacturing a multilayer electronic component, according to an embodiment of the present disclosure, may include preparing a first conductive powder 21 by performing a surface treatment on a metal particle in an oxygen atmosphere; preparing a first ceramic green sheet 11 by applying an internal electrode paste P1 including the first conductive powder 21 to a ceramic green sheet GS; forming a stack body ML by stacking a plurality of ceramic green sheets (e.g., 11, 12, and 13) in the first direction, wherein one or more ceramic green sheets 13 to which the internal electrode paste is not applied are stacked in upper and lower portions of the stack body ML in the first direction, respectively, to form cover portions C1' and C2', a plurality of ceramic green sheets to which the internal electrode paste is applied are stacked in a central portion of the stack body ML in the first direction to form a capacitance formation portion Ac', and a ceramic green sheet disposed in an uppermost portion of the capacitance formation portion Ac' in the first direction is the first ceramic green sheet 11; forming a body 110 including a dielectric layer 111 and an internal electrode (e.g., 121 and 122) by sintering the stack body ML; and forming an external electrode (e.g., 131 and 132) on the body.

Preparation of First Conductive Powder

A first conductive powder 21 may be prepared by performing a surface treatment on a metal particle in an oxygen atmosphere. By forming an internal electrode using the first conductive powder 21, a ratio of $Ni(OH)_2$ mass to NiO mass in the internal electrode may be easily controlled to be 4.5 or more and 7.5 or less.

The surface treatment may be performed using a physical oxygen adsorption process in an oxygen-excessive atmosphere. Uniform thin film coating may be performed using the physical oxygen adsorption process, and quantitative coating of target elements may be easily performed. In addition, as the physical oxygen adsorption process, a sputtering method or a barrel type sputtering method may be used.

In this case, the first conductive powder 21 may include a metal particle 21a and a shell 21b containing $Ni(OH)_2$ disposed on a surface of the metal particle.

The metal particle 21a of the first conductive powder 21 may be Ni, and the shell 21b may further include NiO and Ni. In addition, the first conductive powder 21 may further include one or more of nickel (Ni), copper (Cu), palladium (Pd), silver (Ag), gold (Au), platinum (Pt), tin (Sn), tungsten (W), titanium (Ti), and alloys thereof.

In addition, $Ni(OH)_2$ does not need to be entirely disposed on the surface of the metal particle 21a, but may be disposed on at least a portion thereof.

For example, when the surface treatment is performed using a sputtering method, an amount of $Ni(OH)_2$ contained in the shell 21b may be precisely controlled, and a uniform and thin shell 21b may be formed.

Also, when the surface treatment is performed using a barrel type sputtering method, in a similar manner to the sputtering method, there may be advantages that an amount of $Ni(OH)_2$ contained in the shell 21b may be precisely controlled, and a uniform and thin shell 21b may be formed, conditions of atmosphere gas therein may be precisely controlled, as well, and the shell 21b may be formed using low power.

Preparation of First Ceramic Green Sheet

A first ceramic green sheet 11 may be prepared by applying an internal electrode paste P1 including the first conductive powder 21 to a ceramic green sheet GS.

The internal electrode paste P1 including the first conductive powder 21 may further include a ceramic additive. Therefore, since mismatch in shrinkage behavior between cover portions C1' and C2' and a capacitance formation portion Ac' may be reduced during a sintering process, to improve bonding force between the capacitance formation portion Ac' and the cover portion C1' and C2'. A type of the ceramic additive is not particularly limited, and may be the same as a type of ceramic included in a dielectric layer.

The ceramic green sheet GS does not need to be particularly limited, and the ceramic green sheet may be formed using a ceramic powder. For example, after adding an additive to the ceramic powder, ethanol and toluene as a solvent may be mixed with a dispersing agent, and then a binder may be mixed to form the ceramic green sheet GS. The ceramic powder may be a $BaTiO_3$-based ceramic powder, and examples of the ceramic powder may include $BaTiO_3$, or $(Ba_{1-x}Ca_x)TiO_3(0<x<1)$, $Ba(Ti_{1-y}Ca_y)O_3$ $(0<y<1)$, $(Ba_{1-x}Ca_x)(Ti_{1-y}Zr_y)O_3(0<x<1, 0<y<1)$, or $Ba(Ti_{1-y}Zr_y)O_3(0<y<1)$, in which calcium (Ca), zirconium (Zr), or the like is partially dissolved into $BaTiO_3$, or the like.

A process of applying the internal electrode paste P1 including the first conductive powder 21 may use a screen printing process, a gravure printing process, or the like, but the present disclosure is not limited thereto.

Formation of Stack Body

A stack body ML may be formed by stacking a plurality of ceramic green sheets (e.g., 11, 12, and 13) in the first direction. In this case, one or more ceramic green sheets 13 to which the internal electrode paste is not applied may be stacked in upper and lower portions of the stack body ML in the first direction, respectively, to form cover portions C1' and C2', a plurality of ceramic green sheets to which the internal electrode paste is applied may be stacked in a central portion of the stack body ML in the first direction to form a capacitance formation portion Ac', and a ceramic green sheet disposed in an uppermost portion of the capacitance formation portion Ac' in the first direction may be the first ceramic green sheet 11.

The cover portions C1' and C2' of the stack body ML may become first and second cover portions C1 and C2 of a body 110 after a sintering process, and the capacitance formation portion Ac' of the stack body ML may become a capacitance formation portion Ac of the body 110 after a sintering process.

Although FIG. 10 illustrates that two ceramic green sheets 13 to which the internal electrode paste is not applied are disposed in upper and lower portions of the stack body ML in the first direction, the present disclosure is not limited thereto, and a ceramic green sheet 13 to which the internal electrode paste is not applied may be disposed in upper and lower portions of the stack body ML in the first direction, respectively, or three or more of the ceramic green sheet 13 may be disposed in the upper and lower portions of the stack body ML in the first direction, respectively.

Figure 11:
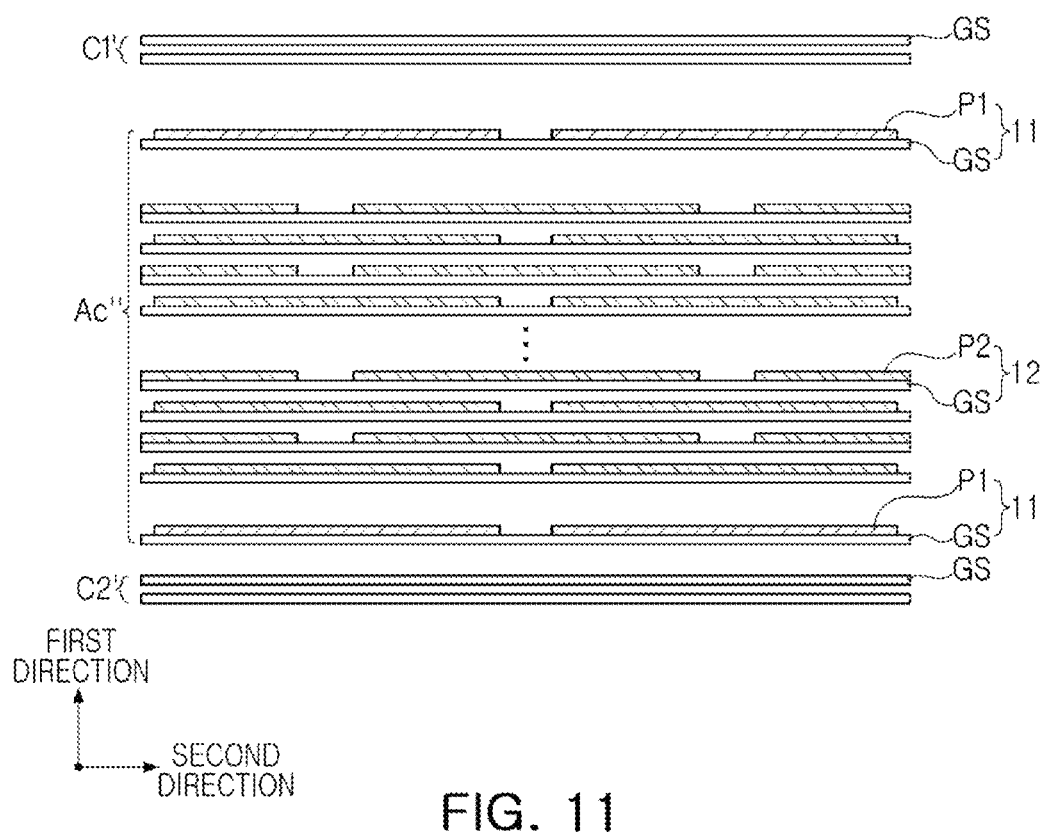
FIG. 11 illustrates a modified example of FIG. 10.

In addition, although it is illustrated that the first ceramic green sheet 11 is disposed singular, two or more of the first ceramic green sheet 11 may be disposed. For example, a plurality of first ceramic green sheets may be disposed in an upper portion of the capacitance formation portion Ac' in the first direction, or the first ceramic green sheets may be disposed in an uppermost portion and a lowermost portion of a capacitance formation portion Ac" in the first direction, as illustrated in FIG. 11. The present disclosure is not limited thereto, and the capacitance formation portion Ac' may be entirely formed by stacking the first ceramic green sheets.

A plurality of ceramic green sheets constituting the capacitance formation portion Ac' may include at least one second ceramic green sheet 12, in addition to the first ceramic green sheet 11.

The second ceramic green sheet 12 may be prepared by applying an internal electrode paste P2 containing a second conductive powder, in which surface treatment is not performed in an oxygen atmosphere, to a ceramic green sheet GS. Even though a separate surface treatment is not performed, when the second conductive powder is Ni, NiO and $Ni(OH)_2$ may be included. Unlike the first conductive powder, a shell including $Ni(OH)_2$ may not be formed. By forming an internal electrode using the second conductive powder that has not been separately surface treated in an oxygen atmosphere, a ratio of $Ni(OH)_2$ mass to NiO mass in the internal electrode may be easily controlled to be 3.0 or less.

In addition, the second conductive powder may further include one or more of nickel (Ni), copper (Cu), palladium (Pd), silver (Ag), gold (Au), platinum (Pt), tin (Sn), tungsten (W), titanium (Ti), and alloys thereof.

The internal electrode paste P2 including the second conductive powder may further include a ceramic additive. Therefore, since mismatch in shrinkage behavior between a dielectric layer and an internal electrode may be reduced during a sintering process, to suppress delamination between the dielectric layer and the internal electrode.

A process of applying the internal electrode paste P2 including the second conductive powder may use a screen-printing process, a gravure printing process, or the like, but the present disclosure is not limited thereto.

Formation of Body

Next, a body 110 including a dielectric layer 111 and an internal electrode (e.g., 121 and 122) may be formed by sintering the stack body. Before the sintering process, the stack body may be cut into chips, and the sintering process may then be performed.

In this case, the sintering process may be performed so that mismatch in shrinkage behavior between the dielectric layer and the internal electrode is minimized by reaching an appropriate temperature at which the internal electrode and the dielectric layer are simultaneously sintered through a rapid increase in temperature within a short time. For example, the sintering process may be performed by increasing a temperature at a temperature increase rate of 40° C./min or more, and more preferably, may be performed by increasing the temperature at a temperature increase rate of 50° C./min or more.

Formation of External Electrode

Next, a multilayer electronic component 100 may be manufactured by forming external electrodes 131 and 132 on the body 110.

A process of forming the external electrodes 131 and 132 is not particularly limited, may use a dipping process using a paste containing a conductive metal and glass, and the external electrodes 131 and 132 may be formed by transferring a sheet including a conductive metal. In addition, the external electrodes may be formed using a paste containing a conductive metal and a resin, or using an atomic layer deposition (ALD) process, molecular layer deposition (MLD) process, a chemical vapor deposition (CVD) process, a sputtering process, or the like.

In addition, a plating process may be additionally performed so that the external electrodes include plating layers 131b and 132b, respectively.

EXPERIMENTAL EXAMPLE

A plurality of ceramic green sheets were stacked, as illustrated in FIG. 10, to form a stack body ML. Thereafter, the stack body was cut into chip units and then sintered to prepare a sample chip.

In Test Nos. 1 to 4, a capacitance formation portion was constructed using Ni powder particles in which surface treatment is not performed in an oxygen atmosphere, and in Test Nos. 5 to 15, a capacitance formation portion was constructed using Ni powder particles in which a physical oxygen adsorption process is performed in an oxygen-excessive atmosphere using a sputtering process. The physical oxygen adsorption process was performed such that amounts of $Ni(OH)_2$ on surfaces of the Ni powder particles were increased, from Test No. 5 toward Test No. 15.

Figure 5:
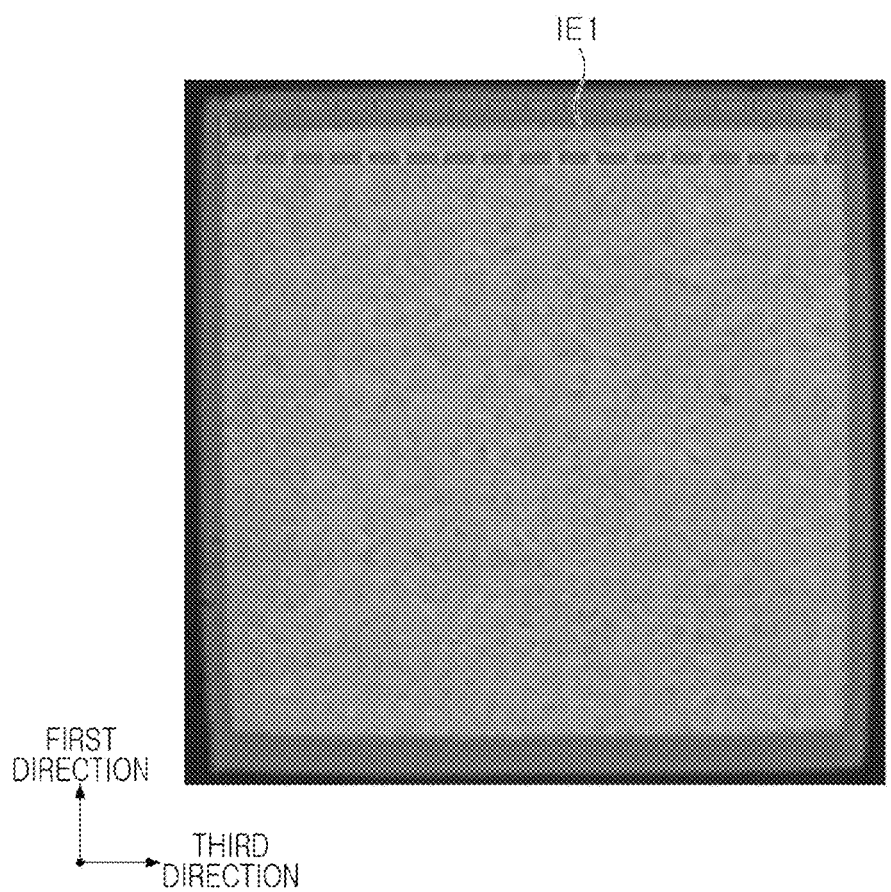
FIG. 5 is a view illustrating a measurement position of X-ray photoelectron spectroscopy (XPS).

As illustrated in FIG. 5, a spectrum L1 was obtained by cutting a central portion of the sample chip in the second direction for each Test No. in the first and third directions, and irradiating a center point of an internal electrode IE1 disposed closest to a first cover portion, in the first and third directions, in a cross-section thereof, with X-rays, and a spectrum L2 by (corresponding to) $Ni(OH)_2$ and a spectrum L3 by (corresponding to) NiO were separated by peaks. Thermo Fisher Scientific X-ray photoelectron spectrometer was used, and Avantage program was used for the peak separation.

For the sample chip for each Test No., a peak value Pv1 of the spectrum L3 by (corresponding to) NiO, an area S1 of the spectrum L3 by (corresponding to) NiO, a peak value Pv2 of the spectrum L2 by (corresponding to) $Ni(OH)_2$, and an area S2 of the spectrum L2 by (corresponding to) $Ni(OH)_2$ were calculated and described in Table 1 below.

In FIG. 6, as a spectrum obtained by the above method for the sample chip of Test No. 12, portion (a) thereof is a graph illustrating a spectrum before peak separation, portion (b) thereof is a graph illustrating a spectrum after peak separation, portion (c) thereof is a graph illustrating an area S2 of a spectrum by (corresponding to) $Ni(OH)_2$, and portion (d) thereof is a graph illustrating an area S1 of a spectrum by (corresponding to) NiO.

Figure 7:
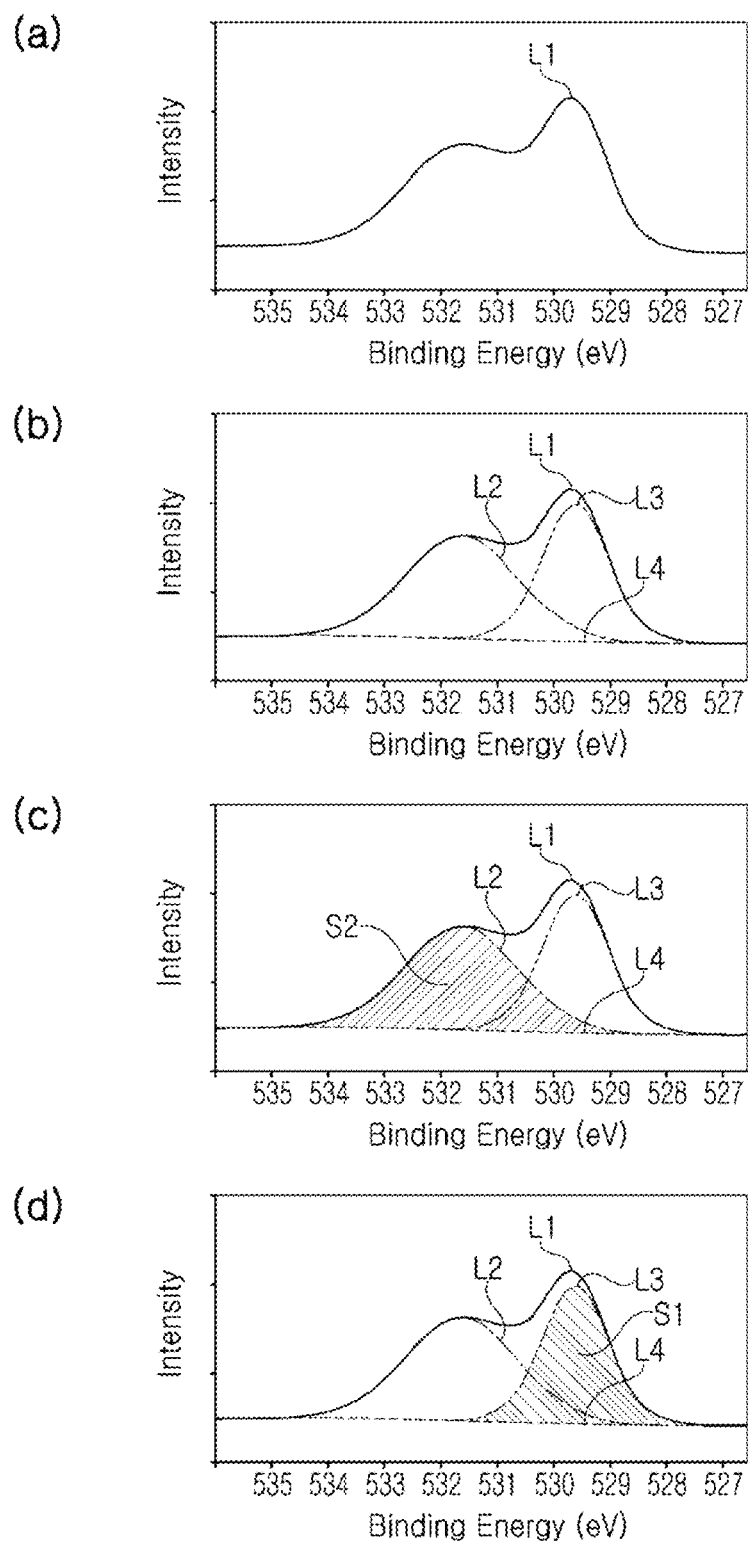
In FIG. 7, as a spectrum of IE1 of Test No. 3 analyzed by X-ray photoelectron spectroscopy (XPS), portion (a) thereof is a graph illustrating a spectrum before peak separation, portion (b) thereof is a graph illustrating a spectrum after peak separation, portion (c) thereof is a graph illustrating an area of a spectrum by $Ni(OH)_2$, and portion (d) thereof is a graph illustrating an area of a spectrum by MiC.
Figure 8:
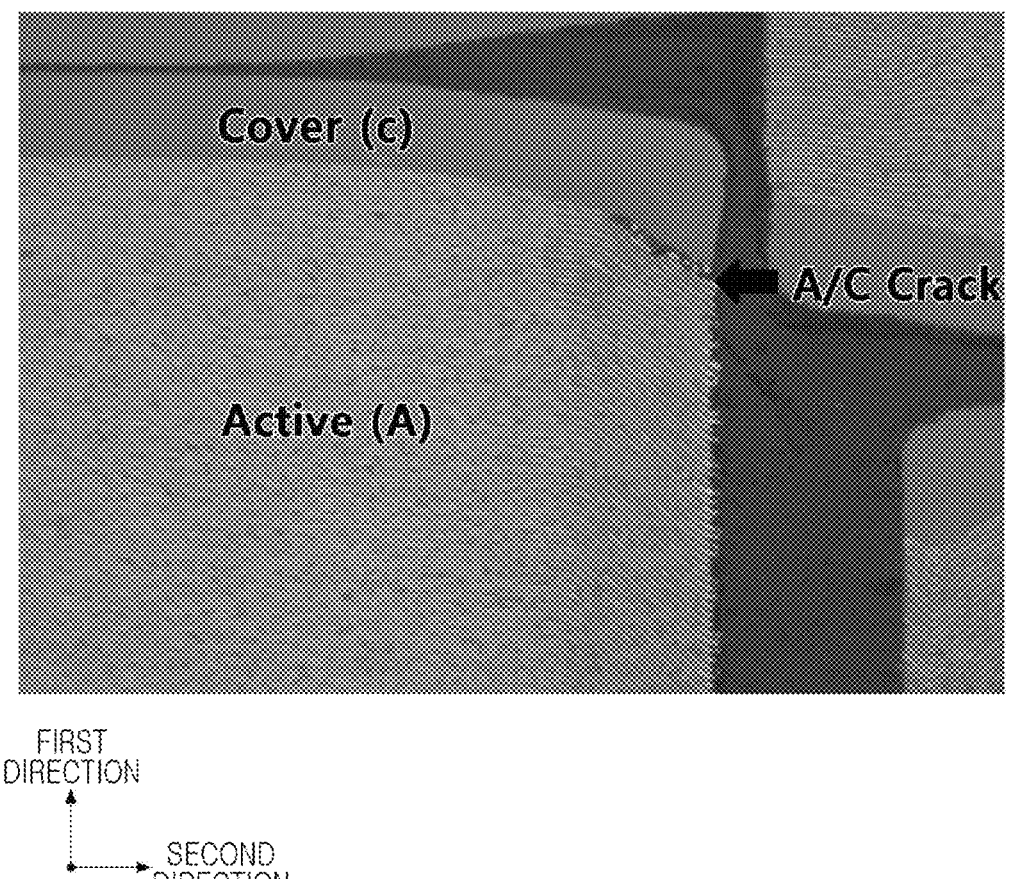
FIG. 8 is a photograph in which A/C cracking between a capacitance formation portion and a cover portion in a cross-section of a sample chip is captured in first and second directions (an LT plane).

In FIG. 7, as a spectrum obtained by the above method for the sample chip of Test No. 3, portion (a) thereof is a graph illustrating a spectrum before peak separation, portion (b) thereof is a graph illustrating a spectrum after peak separation, portion (c) thereof is a graph illustrating an area S2 of a spectrum by (corresponding to) $Ni(OH)_2$, and portion (d) thereof is a graph illustrating an area S1 of a spectrum by (corresponding to) NiO.

For A/C cracking, 2000 sample chips for each Test No. were prepared, and cross-sections cut in the second and first directions from central portions of the sample chips in the third direction were observed. In this connection, it was determined that A/C cracking was occurred if cracking between a capacitance formation portion Ac and a first cover portion C1 by 300 nm or more was observed, and the number of sample chips in which the A/C crack was occurred, among the 2000 sample chips, was illustrated in Table 1 below.

A short circuit rate was determined by preparing 100 sample chips for each Test No. and measuring the sample chips under conditions of measuring voltage: 0.5V and frequency: 1 kHz. In this connection, it was determined as a short circuit if capacitance was measured to be 3.2 µF or less or 4.2 µF or more, and a ratio of the sample chips in which the short circuit was occurred, among the sample chips, was illustrated in Table 1 below.

A breakdown voltage (BDV) was determined under conditions of a pressure increase rate of 20V/sec and a current limit of 20 mA for 10 sample chips for each Test No., and an average value thereof was illustrated.

An adhesive force was determined by pressing and sintering a ceramic green sheet for capacitance formation portion at 1000 $kgf/cm^2$ and measuring under conditions of [measurement speed: 30 mm/min] using Tira's equipment, and the determined adhesive force was illustrated in Table 1 below.

TABLE 1

| Test No. | Pv1 | S1 | Pv2 | S2 | S2/S1 | Pv2/Pv1 | Adhesive Force (N/cm) | A/C Crack | Short Circuit Rate | BDV (V) |
|---|---|---|---|---|---|---|---|---|---|---|
| 1 | 29,700 | 43.00 | 21,100 | 57.10 | 1.33 | 0.71 | 0.282 | 28 | 8% | 71 |
| 2 | 29,700 | 43.00 | 23,200 | 61.70 | 1.43 | 0.78 | 0.284 | 19 | 6% | 70 |
| 3 | 28,100 | 38.20 | 21,100 | 57.10 | 1.49 | 0.75 | 0.276 | 21 | 8% | 72 |
| 4 | 28,100 | 38.20 | 23,200 | 61.70 | 1.62 | 0.83 | 0.285 | 24 | 8% | 72 |
| 5 | 18,400 | 25.00 | 28,200 | 75.00 | 3.00 | 1.53 | 0.287 | 24 | 6% | 72 |
| 6 | 14,900 | 19.00 | 30,700 | 81.70 | 4.30 | 2.06 | 0.289 | 20 | 6% | 74 |
| 7 | 11,000 | 15.00 | 27,100 | 73.20 | 4.88 | 2.46 | 0.310 | 3 | 2% | 74 |
| 8 | 11,000 | 15.00 | 28,700 | 76.35 | 5.09 | 2.61 | 0.307 | 5 | 4% | 76 |
| 9 | 11,000 | 15.00 | 29,800 | 80.60 | 5.37 | 2.71 | 0.306 | 2 | 2% | 75 |
| 10 | 11,000 | 15.00 | 32,800 | 88.80 | 5.92 | 2.98 | 0.303 | 1 | 4% | 73 |
| 11 | 8,400 | 11.40 | 27,100 | 73.20 | 6.42 | 3.23 | 0.302 | 5 | 4% | 76 |
| 12 | 8,400 | 11.40 | 28,900 | 76.72 | 6.73 | 3.44 | 0.317 | 4 | 2% | 71 |
| 13 | 8,400 | 11.40 | 29,800 | 80.60 | 7.07 | 3.55 | 0.291 | 7 | 4% | 72 |
| 14 | 8,100 | 10.99 | 32,900 | 89.01 | 8.10 | 4.06 | 0.261 | 17 | 12% | 65 |
| 15 | 7,100 | 9.68 | 33,300 | 90.07 | 9.30 | 4.69 | 0.252 | 19 | 10% | 63 |

In Test Nos. 1 to 4, S2/S1 values thereof were 1.62 or less and very low, large amounts of A/C cracks thereof were occurred, short-circuit rates thereof were high, and BDVs thereof were also low.

In Test Nos. 7 to 13, it can be seen that S2/S1 values of IE1 were 4.5 or more and 7.5 or less (or more than 4.30 and less than 8.10), A/C cracks were hardly occurred, short-circuit rates thereof were low, and BDVs thereof were also high.

Comparing Test Nos. 6 and 7, it can be seen that there was a significant difference in occurrence of A/C cracking, as a reference point of an S2/S1 value of 4.5 (or 4.3) of IE1.

In Test Nos. 5 and 6, S2/S1 values of IE1 were less than 4.5 (or were 4.3 or less), and A/C cracks, short circuit rates, and BDVs were similar to those of Test Nos. 1 to 4.

In addition, comparing Test Nos. 13 and 14, it can be seen that there was a significant difference in occurrence of A/C cracking, as a reference point of an S2/S1 value of 7.5 of IE1 (or more than 8.1).

In Test Nos. 14 and 15, S2/S1 values of IE1 were more than 7.5 (or 8.1 or more), and A/C cracks thereof were lower, short circuit rates thereof were higher, and BDVs thereof were lower, compared to Test Nos. 1 to 4. Therefore, reliability was deteriorated. It can be determined that this is induced from moisture penetration duet to an increase in hydrophilicity according to an increase in —OH ratio.

The expression "example", except in relation to experimental examples, used in this specification does not refer to the same embodiment to each other, but may be provided for emphasizing and explaining different unique features. However, the above-mentioned examples do not exclude that the above-mentioned examples are implemented in combination with the features of other examples. For example, although the description in a specific example is not described in another example, it can be understood as an explanation related to another example, unless otherwise described or contradicted by the other example.

The terms used in this disclosure are used only to illustrate various examples and are not intended to limit the presently disclosed concept. Singular expressions include plural expressions unless the context clearly dictates otherwise.

As one of the various effects of the present disclosure, bonding force between a first cover portion and a capacitance formation portion may be improved to suppress occurrence of cracking between the first cover portion and the capacitance formation portion, to improve reliability.

One of various effects of the present disclosure is to control a ratio of $Ni(OH)_2$ mass to NiO mass in an internal electrode disposed closest to a first cover portion, to improve bonding force between a capacitance formation portion and the first cover portion.

One of various effects of the present disclosure is to control a ratio of a peak value for $Ni(OH)_2$ to a peak value for NiO in a spectrum of an internal electrode disposed closest to a first cover portion analyzed by X-ray photoelectron spectroscopy (XPS) to have a certain numerical range, to improve bonding force between a capacitance formation portion and the first cover portion.

However, various advantages and effects of the present disclosure are not limited to the above, and will be more easily understood in the process of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
   a body including:
      a plurality of dielectric layers,
      a plurality of internal electrodes,
      a capacitance formation portion in which the plurality of dielectric layers and the plurality of internal electrodes are alternately disposed in a first direction,
      a first cover portion disposed on one surface of the capacitance formation portion in the first direction and including one of the plurality of dielectric layers, and
      a second cover portion disposed on the other surface of the capacitance formation portion in the first direction and including one of the plurality of dielectric layers; and
   an external electrode disposed on the body,
   wherein, among the plurality of internal electrodes, an internal electrode disposed closest to the first cover portion is referred to as IE1, and a ratio of $Ni(OH)_2$ mass to NiO mass in the IE1 is 4.5 or more and 7.5 or less.

2. The multilayer electronic component of claim 1, wherein the ratio of the $Ni(OH)_2$ mass to the NiO mass in the IE1 is 4.88 or more and 7.07 or less.

3. The multilayer electronic component of claim 1, wherein, in at least one of the plurality of internal electrodes, the ratio of the $Ni(OH)_2$ mass to the NiO mass is 3.0 or less.

4. The multilayer electronic component of claim 1, wherein a ratio of a number of internal electrodes having the ratio of the $Ni(OH)_2$ mass to the NiO mass of 3.0 or less to a total number of internal electrodes in the plurality of internal electrodes is 90% or more and less than 100%.

5. The multilayer electronic component of claim 1, wherein an internal electrode disposed closest to the second cover portion is referred to as IE2, and the ratio of the $Ni(OH)_2$ mass to the NiO mass in the IE2 is 4.5 or more and 7.5 or less.

6. The multilayer electronic component of claim 5, wherein the ratio of the $Ni(OH)_2$ mass to the NiO mass in the IE1 and the IE2 is 4.88 or more and 7.07 or less.

7. The multilayer electronic component of claim 1, wherein:
   a region of the capacitance formation portion adjacent to the first cover portion is referred to as K1,
   a region of the capacitance formation portion adjacent to the second cover portion is referred to as K2,
   a region disposed between K1 and K2 is referred to as Kc,
   the ratio of the $Ni(OH)_2$ mass to the NiO mass in internal electrodes present in K1 and K2 is 4.5 or more and 7.5 or less, and
   the ratio of the $Ni(OH)_2$ mass to the NiO mass in an internal electrode present in Kc is 3.0 or less.

8. The multilayer electronic component of claim 7, wherein a ratio of a maximum distance of Kc in the first direction to a maximum distance of the capacitance formation portion in the first direction is 0.9 or more and less than 1.0, and
   K1 and K2 include at least one internal electrode in which the ratio of the $Ni(OH)_2$ mass to the NiO mass is 4.5 or more and 7.5 or less.

9. The multilayer electronic component of claim 1, wherein the IE1 includes a conductive particle including a metal particle and $Ni(OH)_2$ disposed on at least a portion of a surface of the metal particle.

10. The multilayer electronic component of claim 1, wherein an average thickness of each of the plurality of internal electrodes is 0.35 µm or less.

11. The multilayer electronic component of claim 1, wherein an average thickness of each of the plurality of dielectric layers is 0.37 µm or less.

12. The multilayer electronic component of claim 1, wherein an average thickness of the first cover portion is 15 μm or less.

13. The multilayer electronic component of claim 1, wherein:
the body comprises:
first and second surfaces opposing each other in the first direction,
third and fourth surfaces connected to the first and second surfaces and opposing each other in a second direction, and
fifth and sixth surfaces connected to the first to fourth surfaces and opposing each other in a third direction, and
a maximum distance of the multilayer electronic component in the second direction is 0.66 mm or less, and
a maximum distance of the multilayer electronic component in the third direction is 0.33 mm or less.

14. The multilayer electronic component of claim 1, wherein the ratio of the $Ni(OH)_2$ mass to the NiO mass in the IE1 is a ratio of an area of a spectrum corresponding to $Ni(OH)_2$ to an area of a spectrum corresponding to NiO in a spectrum of IE1 analyzed by X-ray photoelectron spectroscopy (XPS).

15. A multilayer electronic component comprising:
a body including:
a plurality of dielectric layers,
a plurality of internal electrodes,
a capacitance formation portion in which the plurality of dielectric layers and the plurality of internal electrodes are alternately disposed in a first direction,
a first cover portion disposed on one surface of the capacitance formation portion in the first direction and including one of the plurality of dielectric layers, and
a second cover portion disposed on the other surface of the capacitance formation portion in the first direction and including one of the plurality of dielectric layers; and
an external electrode disposed on the body,
wherein, among the plurality of internal electrodes, an internal electrode disposed closest to the first cover portion is referred to as IE1, and a ratio of a peak value for $Ni(OH)_2$ to a peak value for NiO in a spectrum of the IE1 analyzed by X-ray photoelectron spectroscopy (XPS) is 2.46 or more to 3.55 or less.

16. The multilayer electronic component of claim 15, wherein, in the IE1, the peak value for the NiO is 8400 or more and 11000 or less, and the peak value for the $Ni(OH)_2$ is 27100 or more and 32800 or less.

17. The multilayer electronic component of claim 15, wherein, in the spectrum of the IE1 analyzed by the X-ray photoelectron spectroscopy, an area of a spectrum corresponding to NiO is referred to as S1 and an area of a spectrum corresponding to $Ni(OH)_2$ is referred to as S2, and the IE1 satisfies $4.88 \leq S2/S1 \leq 7.07$.

18. The multilayer electronic component of claim 17, wherein the S1 of the IE1 is 11.4 or more and 15.0 or less, and the S2 of the IE1 is 73.2 or more and 88.8 or less.

19. The multilayer electronic component of claim 15, wherein, an internal electrode disposed closest to the second cover portion is referred to as IE2, the ratio of the peak value for $Ni(OH)_2$ to the peak value for NiO in a spectrum of the IE2 analyzed by the X-ray photoelectron spectroscopy (XPS) is 2.46 or more and 3.55 or less.

20. The multilayer electronic component of claim 15, wherein, in at least one internal electrode among the plurality of internal electrodes, the ratio of the peak value for $Ni(OH)_2$ to the peak value for NiO in a spectrum of the at least one internal electrode analyzed by the X-ray photoelectron spectroscopy (XPS) is 0.83 or less.

21. The multilayer electronic component of claim 15, wherein:
a region of the capacitance formation portion adjacent to the first cover portion is referred to as K1,
a region of the capacitance formation portion adjacent to the second cover portion is referred to as K2,
a region disposed between K1 and K2 is referred to as Kc,
the ratio of the peak value for $Ni(OH)_2$ to the peak value for NiO in a spectrum of internal electrodes present in K1 and K2 analyzed by the X-ray photoelectron spectroscopy (XPS) is 2.46 or more and 3.55 or less, and
the ratio of the peak value for $Ni(OH)_2$ to the peak value for NiO in a spectrum of an internal electrode present in Kc analyzed by the X-ray photoelectron spectroscopy (XPS) is 0.83 or less.

22. The multilayer electronic component of claim 21, wherein a ratio of a maximum distance of Kc in the first direction to a maximum distance of the capacitance formation portion in the first direction is 0.9 or more and less than 1.0, and
K1 and K2 include at least one internal electrode in which the ratio of the peak value for $Ni(OH)_2$ to the peak value for NiO in the spectrum analyzed by the X-ray photoelectron spectroscopy (XPS) is 2.46 or more and 3.55 or less.

23. The multilayer electronic component of claim 15, wherein an average thickness of each of the plurality of internal electrodes is 0.35 μm or less.

24. The multilayer electronic component of claim 15, wherein an average thickness of each of the plurality of dielectric layers is 0.37 μm or less.

25. The multilayer electronic component of claim 15, wherein an average thickness of the first cover portion is 15 μm or less.

26. The multilayer electronic component of claim 15, wherein:
the body comprises:
first and second surfaces opposing each other in the first direction,
third and fourth surfaces connected to the first and second surfaces and opposing each other in a second direction, and
fifth and sixth surfaces connected to the first to fourth surfaces and opposing each other in a third direction, and
a maximum distance of the multilayer electronic component in the second direction is 0.66 mm or less, and
a maximum distance of the multilayer electronic component in the third direction is 0.33 mm or less.

27. A multilayer electronic component comprising:
a body including:
a plurality of dielectric layers,
a plurality of internal electrodes,
a capacitance formation portion in which the plurality of dielectric layers and the plurality of internal electrodes are alternately disposed in a first direction,
a first cover portion disposed on one surface of the capacitance formation portion in the first direction and including one of the plurality of dielectric layers, and a second cover portion disposed on the other surface of the capacitance formation portion in the first direction and including one of the plurality of dielectric layers; and an external electrode disposed on the body, wherein:

among the plurality of internal electrodes, an internal electrode disposed closest to the first cover portion is referred to as IE1, a ratio of $Ni(OH)_2$ mass to NiO mass in the IE1 is more than 4.30 and less than 8.10.

28. The multilayer electronic component of claim 27, wherein in the IE1, a ratio of a peak value for $Ni(OH)_2$ to a peak value for NiO in a spectrum of the IE1 analyzed by X-ray photoelectron spectroscopy (XPS) is more than 2.06 and less than 4.06.

29. The multilayer electronic component of claim 27, wherein an internal electrode disposed closest to the second cover portion is referred to as IE2, and the ratio of the $Ni(OH)_2$ mass to the NiO mass in the IE2 is more than 4.30 and less than 8.10.

30. The multilayer electronic component of claim 29, wherein in the IE2, a ratio of a peak value for $Ni(OH)_2$ to a peak value for NiO in a spectrum of the IE2 analyzed by X-ray photoelectron spectroscopy (XPS) is more than 2.06 and less than 4.06.

31. The multilayer electronic component of claim 27, wherein, in at least one of the plurality of internal electrodes, the ratio of the $Ni(OH)_2$ mass to the NiO mass is 3.0 or less.

32. A method of manufacturing a multilayer electronic component, comprising:

preparing a first conductive powder by performing a surface treatment on a metal particle in an oxygen atmosphere;

preparing a first ceramic green sheet by applying the first conductive powder to a ceramic green sheet;

forming a stack body including stacking, in a first direction, at least two of the first ceramic green sheet;

forming a body including a dielectric layer and an internal electrode by sintering the stack body, wherein the internal electrode has a ratio of $Ni(OH)_2$ mass to NiO mass of more than 4.30 and less than 8.10; and forming an external electrode on the body.

33. The method of claim 32, wherein the stacking further includes stacking at least one second ceramic green sheet coated with an internal electrode paste including a second conductive powder in which surface treatment has not been performed in the oxygen atmosphere.

34. The method of claim 32, wherein the surface treatment includes a physical oxygen adsorption process.

35. The method of claim 32, wherein the surface treatment includes a sputtering process.

* * * * *